Sept. 26, 1967 — W. J. ROZMUS — 3,343,433
THERMAL WIRE STRIPPER
Filed June 15, 1966 — 2 Sheets-Sheet 1
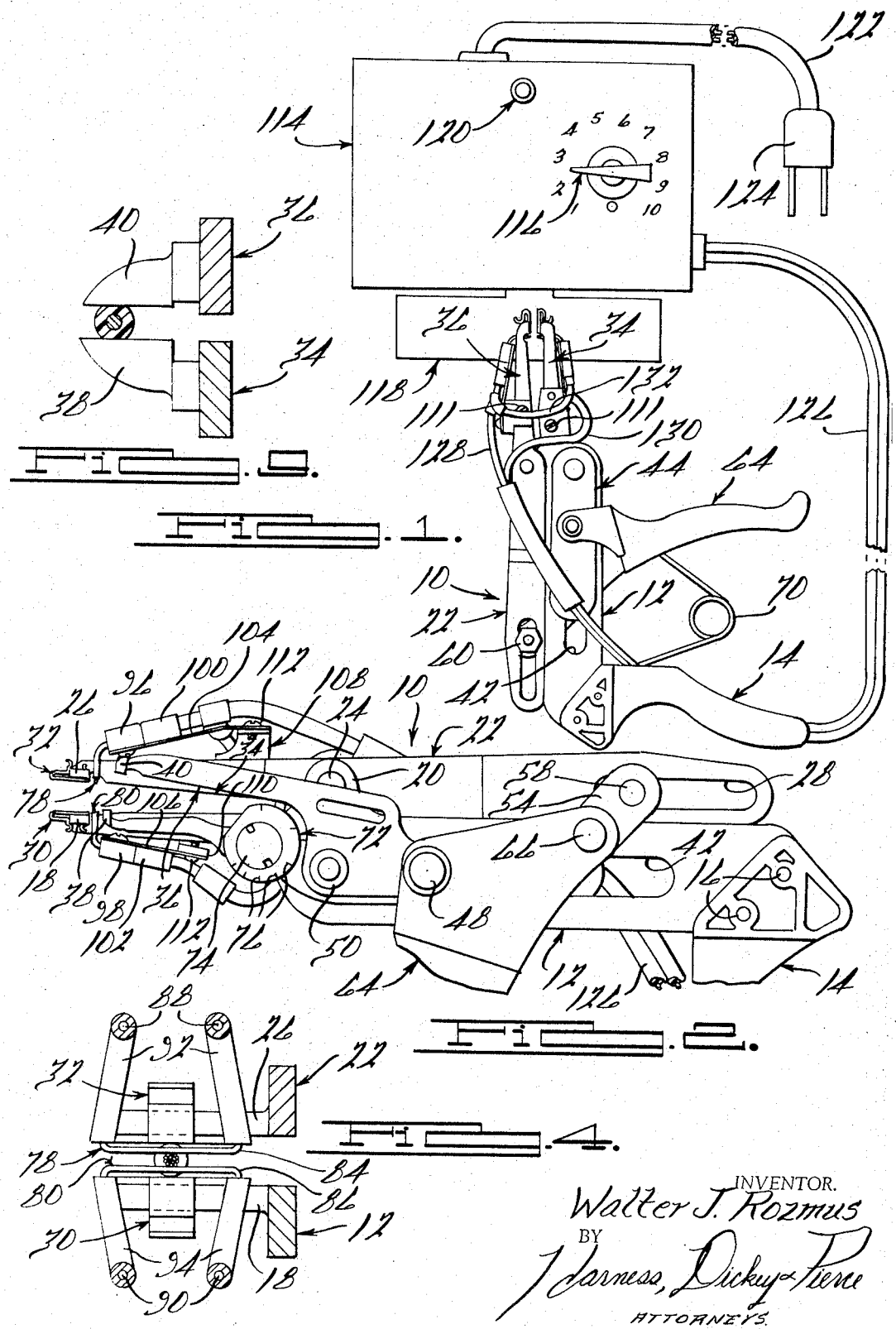
INVENTOR.
Walter J. Rozmus
BY
Harness, Dickey & Pierce
ATTORNEYS.

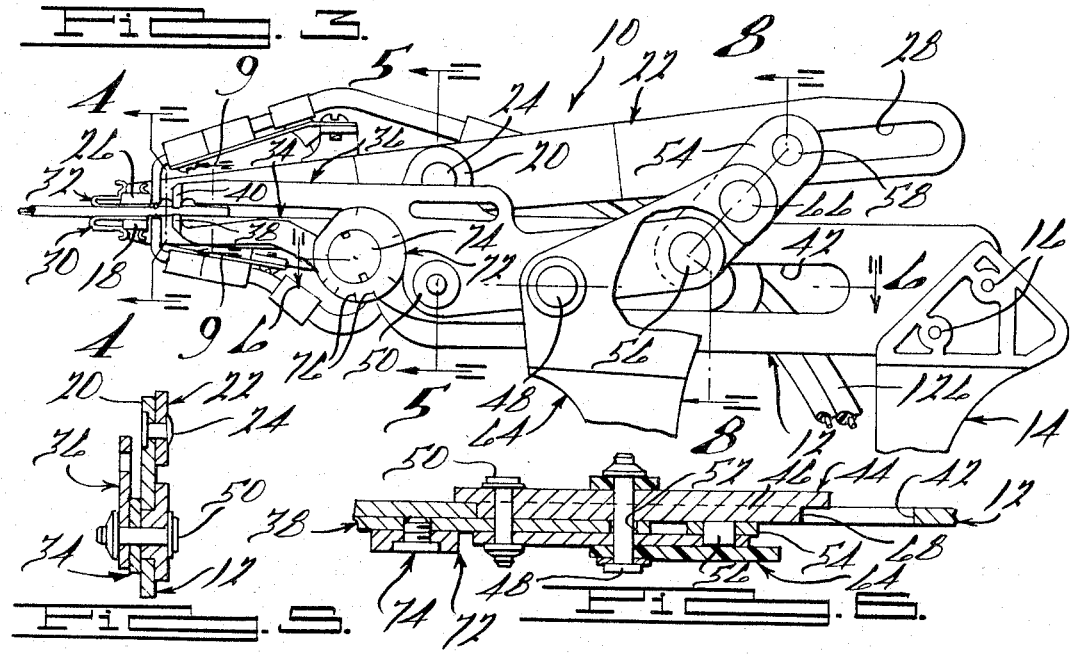
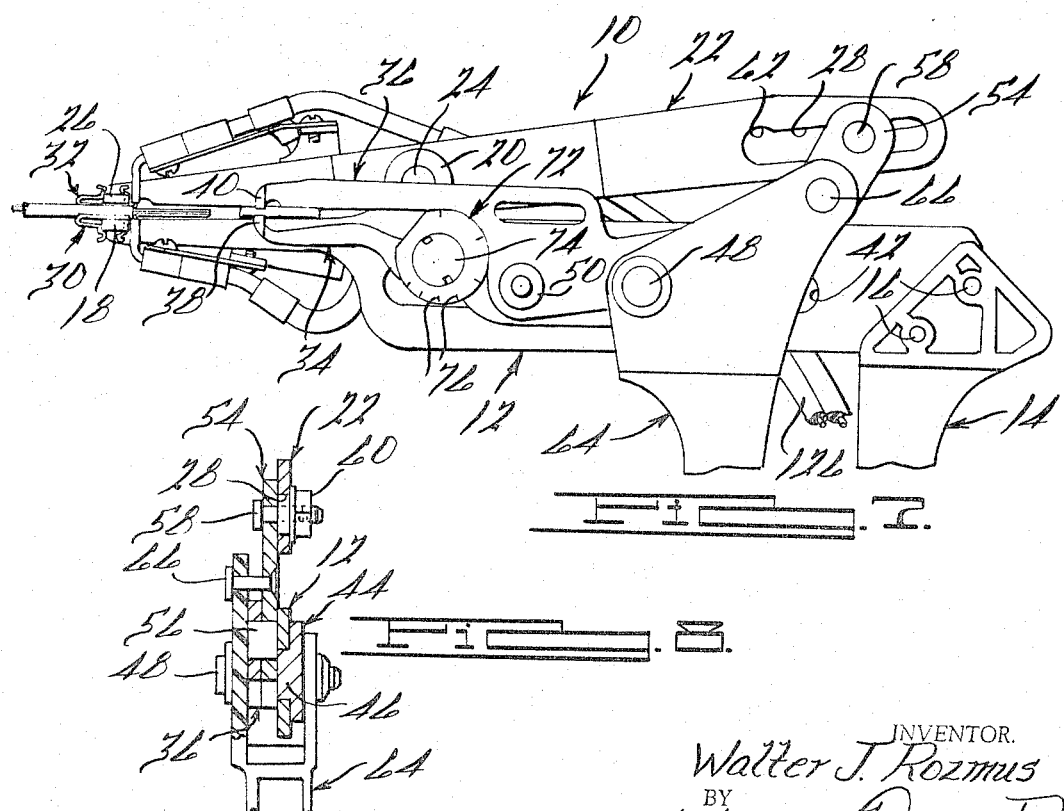

3,343,433
THERMAL WIRE STRIPPER
Walter J. Rozmus, Hubbardsville, N.Y., assignor to Kelsey-Hayes Company, Romulus, Mich., a corporation of Delaware
Filed June 15, 1966, Ser. No. 559,049
11 Claims. (Cl. 81—9.5)

ABSTRACT OF THE DISCLOSURE

A thermal wire stripping tool comprising a first pair of wire gripping jaws, a second pair of wire gripping jaws, a pair of thermal elements interposed between the first and second pairs of jaws, frame means for moving the first and second pairs of jaws into clamping engagement with a wire and for biasing the thermal elements into engagement with the insulation on the wire for severing the same, and means for sequentially biasing one of the pairs of jaws longitudinally of the other pairs of jaws and thereby remove the section of insulation severed by the thermal elements.

---

The purpose of the above abstract is to provide a nonlegal technical statement of the disclosure of the contents of the instant patent application and thus serve as a searching-scanning tool for scientists, engineers and researchers. Accordingly, this abstract is not intended to be used in understanding or otherwise comprehending the principles of the present invention hereinafter described in detail, nor is it intended to be used in interpreting or in any way limiting the scope or fair meaning of the claims appended hereto.

This invention relates generally to hand operated tools and, more particularly, to hand operated wire stripping tools.

For many applications, it is of utmost importance that an electrical wire be free from cuts, nicks, and similar surface abrasions. Accordingly, it is of considerable importance when stripping insulation from such wire to avoid nicking or cutting the wire during the stripping operation. It has been observed that in many instances, even though the insulation is not initially sheared completely through by the stripping or shearing blades of heretofore known and used wire stripping tools, where the insulation is pulled free of the wire by moving the wire and the stripping apparatus relative to one another, the surface of the wire frequently becomes damaged. Such surface damage of many types of wire utilized in miniature circuits may be acute, especially if the components are subjected to vibration where a nick may result in the formation of a stress concentration followed by early failure. Also, where current must be delivered in extremely accurate amounts, a nick or similar type surface abrasion on the wire cannot be tolerated due to the fact that the resistance of the wire may be affected.

The present invention is directed toward a new and improved wire stripping tool which is provided with a pair of thermal elements or electrodes that are adapted to engage the insulation of a piece of wire sequentially with a pair of gripping and stripping jaws, and thereafter function to sever the insulation. The insulation is then removed by moving the pair of stripping jaws relative to the wire and the gripping jaws, and not by the thermal elements, thus eliminating the possibility of any nicks, broken strands or similar damage to the wire.

It is accordingly a primary object of the present invention to provide a new and improved wire stripping tool.

It is another object of the present invention to provide a new and improved wire stripping tool incorporating a pair of thermal elements or electrodes which are adapted to thermally sever the insulation on a piece of wire without damaging the wire conductor adjacent thereto.

It is a further object of the present invention to provide a new and improved thermal wire stripping tool of the above character which is extremely durable and requires only a low voltage power supply.

It is a further object of the present invention to provide a new and improved thermal wire stripping tool of the above character wherein the thermal elements are detachably mounted, whereby to provide for convenient replacement thereof.

It is another object of the present invention to provide a new and improved thermal wire stripping tool of the above character which utilizes a simple cam-type stop adjustment so that the tool may accommodate wires of different sizes.

It is still another object of the present invention to provide a thermal wire stripping tool which is extremely versatile and is thereby adapted to handle all types of thermalplastic and similar type insulated wire.

It is yet another object of the present invention to provide a new and improved thermal wire stripping tool of the above character wherein the gripping pairs of jaws establish a natural path of relative travel between the wire and the stripping jaws, thus preventing damage to the wire during the stripping operation.

Other objects and advantages of the present invention will become apparent from the following detailed description, taken in conjunction with the accompanying drawings, wherein:

FIGURE 1 is a top elevational view, partially broken away, of the thermal wire stripping tool in accordance with an exemplary embodiment of the present invention;

FIGURE 2 is an enlarged fragmentary side elevational view of the wire stripping tool illustrated in FIGURE 1;

FIGURE 3 is a view similar to FIGURE 2 with the wire gripping jaws illustrated therein disposed in a closed position;

FIGURE 4 is an enlarged cross-sectional view of the wire stripping tool illustrated in FIGURE 3, as taken substantially along the line 4—4 thereof;

FIGURE 5 is a cross-sectional view of the wire stripping tool illustrated in FIGURE 3, as taken substantially along the line 5—5 thereof;

FIGURE 6 is a cross-sectional view of the wire stripping tool illustrated in FIGURE 3, as taken substantially along the line 6—6 thereof;

FIGURE 7 is a view of the wire stripping tool of the present invention showing the wire stripping jaws thereof in a retracted position;

FIGURE 8 is a fragmentary cross-sectional view of the wire stripping tool illustrated in FIGURE 3, as taken substantially along the line 8—8 thereof, and FIGURE 9 is a cross-sectional view of the wire stripping tool illustrated in FIGURE 3, as taken substantially along the line 9—9 thereof.

Referring now to the drawings, a thermal wire stripping tool 10, in accordance with an exemplary embodiment of the present invention, is shown as comprising an elongated lower frame member 12 having a downwardly extending fixed handle member 14 rigidly secured to the rear end thereof, as by suitable screws, bolts or the like, generally designated 16. The opposite end of the frame member 12 is formed with a flat laterally extending jaw section 18, and a pivot tab 20 is formed intermediate the opposite ends of the frame member 12 and extends upwardly therefrom, as illustrated in FIGURE 2.

An elongated upper frame member, generally designated 22, extends substantially parallel to the lower frame member 12 and is pivotably secured thereto by a suitable pivot pin 24 which extends through the aforementioned pivot tab 20 and an intermediate portion of the upper frame member 22. The frame member 22 is provided with a flat laterally extending jaw section 26 which is cooperable with and disposed adjacent the upper edge of the jaw section 18. The opposite end of the upper frame member 22 is formed with an elongated camming slot 28. It will be noted that the pivotal connection between the frame members 12 and 22 provides for a rocker arm type of movement of the frame member 22 relative to the frame member 12, as will hereinafter be described in detail. The jaw sections 18 and 26 are provided with a pair of inter-engageable gripping jaw members 30 and 32 having clip-like mounting sections adapted to be detachably secured to the associated jaw sections 18, 26 to provide for convenient removal thereof in the event they become damaged or worn any appreciable amount. The mutually confronting surfaces of the jaw members 30 and 32 are preferably serrated so as to firmly grip a wire inserted therebetween.

A pair of cooperating insulation stripping jaw members 34 and 36, having inter-engageable jaw sections 38 and 40, respectively, are adapted to close upon the end of a wire inserted within the forward end of the tool 10, and thereafter tightly grip a severed portion of the wire insulation and remove said portion from the end of the wire. Such stripping action is accomplished by causing the jaw members 34 and 36 to initially close to a predetermined position, and thereafter to be drawn away from the gripping jaws 30 and 32. More particularly, the stripping jaw member 36 is made to close upon the jaw member 34, at which time both of the jaw members 34, 36 are adapted to slide along a fixed rectilinear path away from the gripping jaws 30 and 32. In order to accomplish the aforedescribed sliding action of the stripping jaw members 34 and 36, an elongated slot 42 is formed in the lower frame member 12 and a slide carriage member 44, having a boss 46 (see FIGURE 6) slidably disposed within the slot 42, is reciprocally movable relative to the lower frame member 12. A pair of pivot pins 48 and 50 secure the stripping jaw 36 to the carriage member 44. The jaw member 36 is pivoted intermediate its opposite ends upon the pivot pin 50, and an enlarged bore 52 is formed in the stripping jaw 38 to allow the pivot pin 48 to pass through the jaw 38 without restricting its pivotal movement.

In operation of the tool 10 of the present invention, it is intended that the gripping jaw members 30 and 32 engage and tightly grip the wire prior to engagement of the wire by the stripping jaw sections 38 and 40. Accordingly, the tool 10 is designed such that the adjacent ends of the upper frame member 22 and the stripping jaw 36 pivot about the pins 24 and 50, in that order. This function is accomplished by means of an elongated link 54 pivotably connected at its opposite ends by a pin 56 to the jaw member 36 and a pin 58 to the upper frame member 22. Thus, because of the link connection, whenever one of the members 22 or 36 pivots, the other will pivot. Further, by the application of a lifting force intermediate the ends of the links 54, applied in an arcuate path upwardly and forwardly, the frame member 22 is urged to pivot at a faster rate than the jaw member 36.

Subsequent to the stripping jaw members 34 and 36 being pivoted toward one another in a manner such that the jaw sections 38 and 40 compressingly engage the outer periphery of the wire, the portion of the wire forward of the jaw sections 38 and 40 is clamped between the gripping jaw members 30 and 32. Thereafter, the members 34 and 36 are caused to move as a unit from the position illustrated in FIGURE 3 to the position illustrated in FIGURE 2, causing a portion of the insulation to be pulled or stripped off the end of the wire.

To allow the jaw members 34 and 36 to move toward the rear of the tool 10, the pin 58 is longitudinally slidable within the slot 28. A friction nut 60 (see FIGURE 8) provides an adjustable degree of resistance against such sliding movement of the pin 58 in the slot 28, but not sufficient resistance to preclude such movement. Further, the slot 28 is formed with a detent surface 62 at its forward end, whereby the pin 58 acts as a cam follower in sliding over this detent by the upward and forward movement of the link 54. Thus, the friction nut 60 can be tightened to a degree needed for the overall resistance to travel, and the detent serves the purpose of providing considerable initial resistance to movement of the pin 58.

The fixed handle 14 is cooperable with a movable or pivotal handle 64 which is in the form of a pistol grip and is pivotably connected to the jaw members 34, 36 and the slide carriage 44 by the pin 48. The upper end of the handle 64 is also pivotably connected to an intermediate portion of the link 54 by means of a pivot pin 66. When the friction nut 60 is properly tightened and the handles 14, 64 are positioned away from each other, as illustrated in FIGURE 1, the jaw members 30 and 32 are in an open position and likewise the stripping jaw sections 38 and 40 are in an open position. When the handles 14, 64 are squeezed together, the combined force of the friction nut 60 abutting against the upper frame member 22 and the abutment of the cam surface detent 62 and the pin 58 provides a reaction force greater than the force required to cause the frame members 12 and 22 to pivot to a closed position, and which force is also greater than the force required to cause the jaw members 34 and 36 to pivot to a closed position. Thus, upon squeezing the handles 14, 64 together, the initial result is that the stripping jaw members 34 and 36 move toward their closed position. Upon continued squeezing of the handles 14, 64, the frame members 12 and 22 will be pivoted toward one another until the jaw members 30, 32 firmly engage the periphery of the wire insulation. Still further squeezing of the handles 14 and 64 results in the force exerted by the friction nut 60 and the abutment of the pin 58 in detent 62 being overcome and the slide carriage 44 and pin 58 moving rearwardly in the slots 42 and 28, respectively. Since both of the jaw members 34 and 36 are secured to the slide carriage 44, they will be moved rearward with the carriage 44, thus causing the members 34, 36 to move away from the gripping jaw members 30 and 32. The slide carriage 44 is provided with a rear stop shoulder 68 which will abut the rear end of the slot 42, thereby limiting the rearward movement of the carriage 44. A handle spring 70 is interposed between the confronting sides of the handle members 14 and 64, which spring 70 is adapted to resiliently resist movement of the handle member 64 toward the member 14 and thus will normally urge the members 14 and 64 to the widely spaced position illustrated in FIGURE 1.

An eccentric stop member 72 is rotatably mounted, as by a suitable pin or stud 74, on an intermediate portion of the stripping jaw member 36. The stop member 72 is adapted to abut against the lower side of the member 36 and thereby limit movement of the jaw member 36 toward the member 34 in accordance with the size or gauge of wire from which the tool 10 is stripping insulation. The stop member 72 may be calibrated and provided with suitable indicia 76 to facilitate adjustment thereof in accordance with the size of wire being stripped.

Referring now in detail to the construction of the thermal elements or electrodes which are utilized in severing insulation on the end of a piece of wire, whereby to permit the stripping jaw members 34 and 36 to strip or remove the thus severed portion of insulation, as best seen in FIGURES 2 and 3, a pair of generally U-shaped thermal electrodes 78 and 80 are respectively disposed between the jaw member 32 and jaw section 40, and between jaw member 30 and the jaw section 38. The electrodes 78 and 80 are provided with substantially parallel insulation severing sections 84 and 86, respectively, which, as best illustrated in FIGURE 3, are adapted to sever a portion of the insulation on a piece of wire in a manner hereinafter to be described. The severing sections 84 and 86 of the electrodes 78, 80 are integrally formed with upwardly and downwardly extending leg sections 88 and 90, respectively, that are properly insulated or shielded, as seen at 92 and 94. The leg sections 88 and 90 are mounted within suitable removable terminal housings 96 and 98 which are releasably secured one to each of a pair of fixed terminal housings 100 and 102, respectively, as seen in FIGURE 2. The fixed terminal housings 100 and 102 are respectively fixedly secured to a pair of electrode mounting plates 104 and 106 which are fixedly secured at their rearward ends to a pair of mounting brackets 108 and 110, as by suitable screws, bolts or the like, generally designated 112. The brackets 108 and 110 are respectively rigidly secured to the sides of the upper and lower frame members 22 and 12 by suitable screws or bolts illustrated in FIGURE 1 and generally designated by the number 111. With the above described construction, the electrodes 78 and 80 may be conveniently removed by unsecuring the terminal housings 96, 98 from the fixed housings 100 and 102, whereby to provide for rapid replacement of the electrodes 78, 80 in the event they become worn or damaged.

The electrodes 78 and 80 are adapted to be heated by any suitable low voltage source, for example, a suitable transformer or the like, such as the one illustrated in FIGURE 1 and generally designated by the number 114. The transformer 114 may be provided with adjustable control means 116 for varying the power output, and with a cutoff relay plate 118 upon which the tool 10 may be rested to break the circuit communicating electric current to the electrodes 78 and 80. A suitable indicator light 120 may be provided to indicate when the transformer 114 is operating and electric current may be supplied to the transformer 114 by means of an electrical outlet cord 122 having a plug 124 adapted to be plugged into a conventional electrical receptacle as is commonly available. Current is communicated to the electrodes 78 and 80 from the transformer 114 by means of a suitable electrical conduit 126 having conductors 128 and 130 which are respectively attached to one of the leg members 88 and 90 of each of the electrodes 78 and 80. Another conductor 132 is connected between the remaining leg members 88 and 90 of each of the electrodes 78, 80 to complete the electrical circuit.

It will be seen that the electrodes 78 and 80 are disposed slightly inwardly toward one another with respect to the jaw members 30 and 32 such that upon actuation of the tool 10, the eelctrodes 78, 80 will engage a wire disposed within the forward end of the tool just after the stripping jaw sections 38 and 40 engage the wire, but prior to the gripping jaws 30 and 32 engaging the wire. Accordingly, in operation of the tool 10, a wire is sequentially engaged, first by the stripping jaws 34 and 36, next by the electrodes 78 and 80, and thereafter by the gripping jaw members 30 and 32.

To facilitate correlating all the hereinabove described component parts of the thermal wire stripping tool 10 of the present invention, a brief description of an exemplary operational cycle thereof will now be given.

Initially, the power supply, such as the transformer 114, is turned on and adjusted to a predetermined power output. Also, the eccentric stop member 72 is adjusted to limit the movement of the stripping jaw member 36 toward the jaw 34 in accordance with the particular size or gauge of wire to be stripped. With the jaw members 30, 32 and 34, 36 disposed in their respective positions illustrated in FIGURE 2, the end of the wire to be stripped is placed between the jaw members 30, 32 and jaw sections 38, 40 and allowed to extend beyond the electrodes 78 and 80 the distance to which the insulation is to be stripped. The handles 14 and 64 are then squeezed together, which squeezing will initially close the stripping jaw members 34 and 36, resulting in the jaw sections 38 and 40 engaging the periphery of the wire. Further squeezing movement of the handles 14 and 64 will result in the upper frame member 22 being pivoted in a manner such that the forward end thereof is moved toward the lower frame member 12. As this occurs, the electrodes 78 and 80 will be biased toward the wire and, by virtue of the electrodes 78, 80 being heated, they will sever the insulation in the manner illustrated in FIGURE 2. Subsequent to the electrodes 78 and 80 engaging the insulation, the gripping jaw members 30 and 32 will tightly engage the periphery of the wire. After the jaw members 30, 32 and jaw sections 38, 40 have firmly closed against the wire and the electrodes 78 and 80 have severed the insulation in the manner illustrated in FIGURE 2, the handles 64 and 14 are further squeezed together, resulting in the stripping jaw members 34 and 36 moving away from the gripping jaw members 30 and 32, thus pulling the insulation away from the wire by means of relative movement between the wire and the jaw members 34 and 36. After the severed insulation has been pulled free from the rest of the wire by movement of the jaw members 34 and 36, the handles 64 and 14 may be released. Since the spring 70 was compressed during the squeezing of the handles 14, 64, it will resiliently urge the handle 64 away from the handle 14, resulting in the stripping jaws 34 and 36 moving toward the forward end of the tool 10, and further resulting in the forward end of the upper frame member 22 being pivoted away from the lower frame member 12, thereby separating the jaw members 30 and 32 and positioning the various components of the tool 10 preparatory to the next operational cycle thereof.

While it will be apparent that the exemplary embodiment illustrated herein is well calculated to fulfill the objects above stated, it will be appreciated that thermal wire stripping tool 10 of the present invention is susceptible to modification, variation and change without departing from the proper scope or fair meaning of the subjoined claims.

What is claimed is:
1. In a thermal wire stripping tool,
a first pair of wire gripping jaws,
a second pair of wire gripping jaws,
a pair of thermal elements interposed between said first and second pairs of jaws,
means for moving said first and second pairs of jaws and said pair of thermal elements between open and closed position, and
means supporting one of said pairs of gripping jaws for longitudinal sliding movement relative to a wire to be stripped, and means including slideway means on said supporting means and actuating handle means for sequentially moving said pairs of said jaws and said thermal elements to said closed position and thereafter moving said one pair of jaws longitudinally of the wire, whereby to remove a section of insulation axially therefrom.
2. The invention as set forth in claim 1 which includes power means for supplying electric current to said thermal elements.
3. The invention as set forth in claim 1 wherein said thermal elements are detachably secured to the tool.
4. The invention as set forth in claim 1 which includes handle means for moving said first and second pairs of wire gripping jaws and said pair of thermal elements between said open and closed positions.
5. The invention as set forth in claim 4 which includes spring means for biasing said first and second pairs of wire gripping jaws and said pair of thermal elements to said open position.
6. In a thermal wire stripping tool,
frame means,
a fixed wire gripping jaw on said frame means and a cooperating,
pivotably connected gripping jaw,
a reciprocal slide carried by said frame means,
a pair of pivotally cooperable stripping jaw members carried by said slide,
a pair of thermal elements carried one on said frame means and the other on said cooperating gripping jaw, means for sequentially closing said stripping jaw members, biasing said thermal elements into engagement with a wire and closing said gripping jaws and thereafter actuating said slide to move said stripping jaw members away from said thermal elements, said closing and actuating means including linkage means connected to said stripping jaw members and to said pivotally connected gripping jaw, and an actuating lever connected to said slide and to said linkage means for actuating gripping jaws, said thermal elements and said stripping jaws.

7. The invention as set forth in claim 6 wherein said closing and actuating means further includes a cam slot in said pivotally connected gripping jaw and a cam follower on said linkage means and slidably engageable in said slot.

8. The invention as set forth in claim 6 including an adjustable eccentric stop to limit movement of one of said jaws toward a closed position.

9. The invention as set forth in claim 6 wherein said thermal elements comprise a pair of thermal electrodes, terminal means for detachably securing said electrodes on said gripping jaws, and which includes power means for supplying electrical power to said electrodes.

10. The invention as set forth in claim 9 which includes means for varying the amount of electric current supplied to said electrodes by said power supply means.

11. The invention as set forth in claim 6 which includes detachably mounted jaw members on said gripping jaws.

References Cited

UNITED STATES PATENTS

| | | | |
|---|---|---|---|
| 2,768,276 | 10/1956 | Arntzen | 81—9.5 |
| 3,125,908 | 3/1964 | Rozmus | 81—9.5 |
| 3,139,777 | 7/1964 | Gindoff | 81—9.5 |
| 3,199,383 | 8/1965 | Gudmestad | 81—9.51 |
| 3,226,815 | 1/1966 | Kelly | 81—9.5 |

WILLIAM FELDMAN, *Primary Examiner.*

MILTON S. MEHR, *Examiner.*